United States Patent [19]

Richter

[11] 4,245,344
[45] Jan. 13, 1981

[54] PROCESSING SYSTEM WITH DUAL BUSES

[75] Inventor: David L. Richter, Plano, Tex.

[73] Assignee: Rockwell International Corporation, El Segundo, Calif.

[21] Appl. No.: 25,815

[22] Filed: Apr. 2, 1979

[51] Int. Cl.³ .................... G06F 11/14; G06F 11/10
[52] U.S. Cl. .................................. 371/68; 371/8; 371/49
[58] Field of Search ............ 340/146.1 BE; 235/306, 235/307; 371/8, 49, 68

[56] References Cited

U.S. PATENT DOCUMENTS

| | | | |
|---|---|---|---|
| 3,476,922 | 11/1969 | Yiotis | 340/146.1 BE |
| 3,781,795 | 12/1973 | Zegers | 340/146.1 BE |
| 3,978,327 | 8/1976 | Huber | 340/146.1 BE |
| 3,999,053 | 12/1976 | Dalmasso | 235/306 |
| 4,017,828 | 4/1977 | Watanabe et al. | 340/146.1 BE |

Primary Examiner—Jerry Smith
Attorney, Agent, or Firm—V. Lawrence Sewell; Howard R. Greenberg; H. Fredrick Hamann

[57] ABSTRACT

A processing system is disclosed in which transfers between processors and memory are made on dual redundant buses. In a transfer, the transmitting unit sends the same information simultaneously on each of the buses. The receiving unit makes parity checks on each bus, and compares the information received on one bus with that received on the other bus. The receiving unit includes means for implementing a decision rule, based on these checks and comparison, to choose from which bus to take information, if either.

13 Claims, 6 Drawing Figures

PROCESSING SYSTEM WITH DUAL BUSES

BACKGROUND OF THE INVENTION

This invention relates to a processing system of the kind including one or more processors and memory modules communicating by means of a multiple conductor bus.

The present invention is intended to have a particular utility in communications systems requiring data and circuit switching. Such systems, operating in real time, must operate very reliably. As the systems become progressively more complex, this requirement is increasingly more difficult to meet. For example, it is advantageous to design systems having multiple processors, including in some cases multiple processors accessing the same memory. It is often difficult to detect accurately the source of an error occurring in such a system, particularly if the error is intermittent. However, if errors are not detected and allowed to accummulate, the entire system may become involved, reaching a state from which recovery is impossible. In an application such as automatic funds transfer, it is highly undesirable for such an unrecoverable state to be reached.

SUMMARY OF THE INVENTION

In accordance with the present invention, there is provided a processing system having transfer between devices such as processors and memory modules by means of at least two redundant buses. The sending device transfers identical information on each of the buses to the receiving device. The receiving device not only checks the information received on each bus, but also compares the received information on the buses and decides from which bus to use information, if either.

In a preferred embodiment, the receiving device decides not to utilize signals received on one of the buses, if the parity of a data portion of the bus signals is not good. Additionally, the signals from the bus are not utilized, if parity is bad for a portion of the signals which includes the receiving device address. The signals from neither bus are utilized, if the received signals appear good in other respects, but are not received the same on each bus.

Through the use of the various parity checks, the system of the invention can identify which bus is at fault, for those situations were a single bit or an odd number of bits are in error. In a situation, in which the signals of one bus are correct, the system of the invention can detect errors involving any number of bits, by comparison of the two buses. By contrast, circuits presently used in a conventional memory module can detect one bit errors.

In most cases in which an error is detected, the system will be able to utilize the signals of one bus, allowing successful completion of the attempted operation. This provides the capability for an overall system which employs the dual bus architecture to progress toward a state in which the source of the error can be traced and repaired.

While the overall system is in transition to a condition permitting repair, the use of the good bus path prevents the introduction of any errors into the main processing task being performed. Furthermore, the utilization of one good bus path prevents the existence of a fault from incapaciting the error recovery procedures of the overall system. The ability of the system of the invention to continue accurate operation in the presence of an error, provides considerable opportunity to locate intermittent faults.

In a conventional single bus system, an error not detected or corrected can introduce a mistake into the main processing task of the system. Moreover, it can interfere with recovery of the overall system from the occurrence of the error and hinder the precise location of the source of the error.

In the system of the invention, after an error has been detected on a bus and the system is in a condition permitting repair, various checkout procedures can be performed on the one bus while the main processing task is continued on the other bus. In a conventional single bus system, this would, of course, not be possible.

Thus, in general, the processing system of the present invention permits the precise location of sources of error in a harsh processing environment. It does so in a way which minimizes mistakes in the main processing task and in error recovery routines. Moreover, a bus without errors can be used to continue the main processing task, while repairs are instituted.

DESCRIPTION OF A PREFERRED EMBODIMENT

Figure 1:
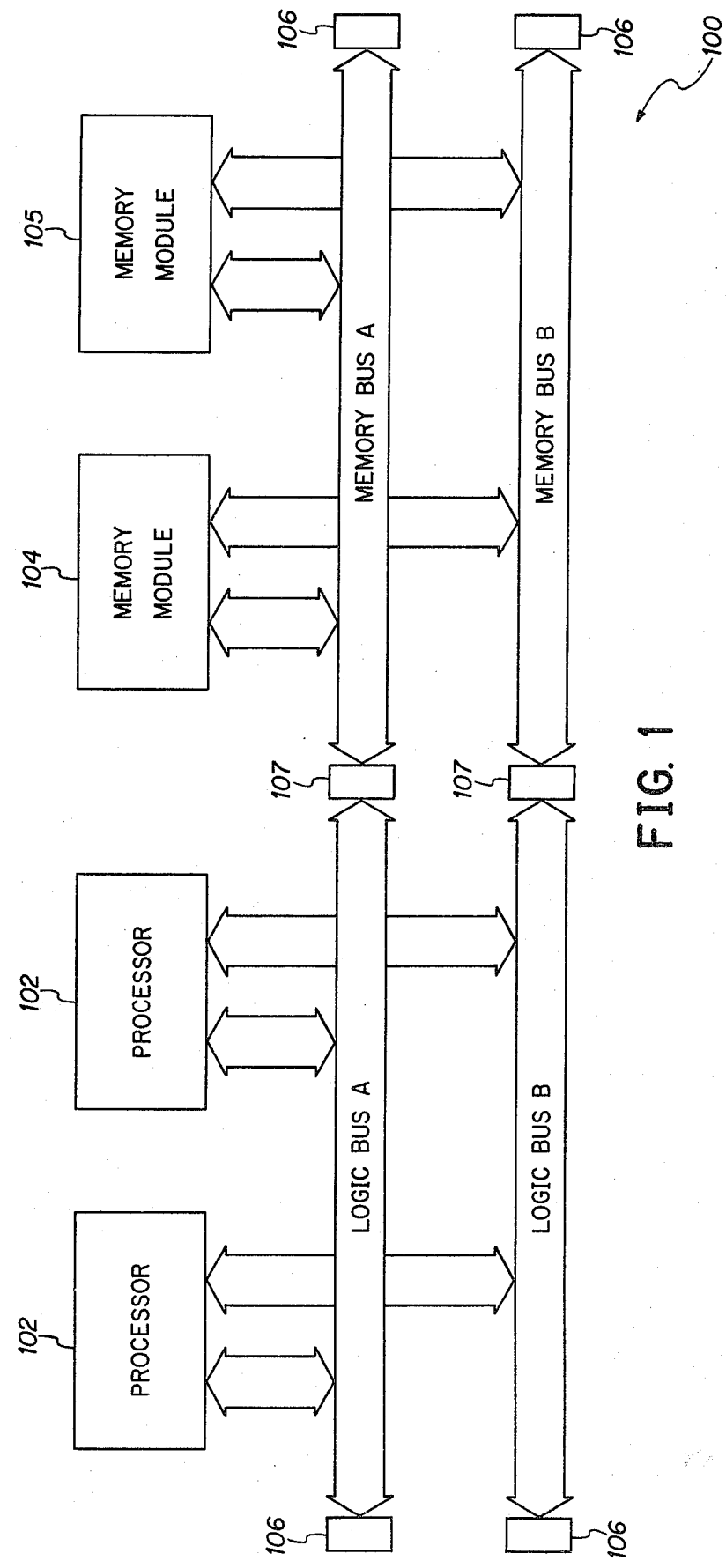
FIG. 1 is a block diagram of a processing system utilizing duplicate buses in accordance with the principles of the invention.

FIG. 1 shows a processing system according to the invention, indicated generally by the reference numeral 100. The system 100 includes multiple processors 102 and multiple memory modules, represented by modules 104 and 105. For clarity, the system will be described in the most general terms, as though any processor is expected to communicate with any memory module. Each processor is interconnected with each memory module by duplicate buses. The processors 102 directly interconnect with logic buses A and B, while the memory units 104 connect with memory buses A and B. The buses end in termination units 106 and 107. In the configuration of FIG. 1, terminations 107 simply connect logic bus A to memory bus A, so that they essentially form one continuous bus, and logic bus B is connected to memory bus B. In such a case, each connected logic bus and memory bus can be replaced with one continuous bus.

When one device in system 100 transfers information to another device, it sends identical copies of the information along the two buses A and B. For example, when one of the processors 102 performs a read from memory, it sends the relevant memory address and other necessary information along both buses A and B.

The addressed memory module examines the contents of both buses A and B and selects the information on one of the buses for use. Then when the memory module sends data back to the processor, it sends the same data along both buses, and the processor decides which copy of the data to accept.

Figure 2:
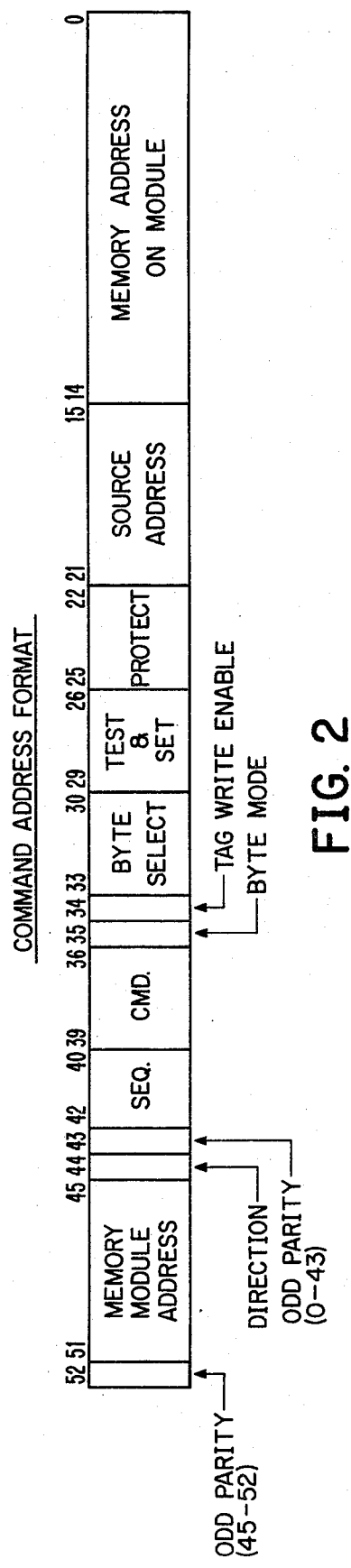
FIG. 2 is a diagram of a preferred bit structure on each bus of the system of FIG. 1, when a command address format is transmitted.
Figure 3:
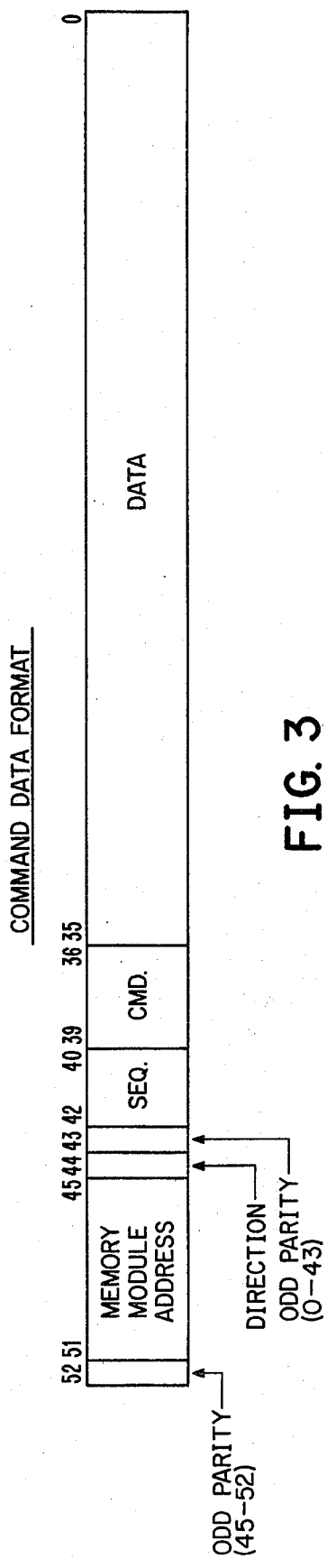
FIG. 3 is a diagram of a preferred bit structure on each bus of FIG. 1, when a command data format is transmitted.

In a preferred embodiment, the message signal portion of each bus transfers 52 bits. FIGS. 2 and 3 illustrate preferred bit structures on the bus. FIG. 2 shows a "command address" format, while FIG. 3 is a "command data" format. The command address format of FIG. 2 is used, for example, in the execution of a READ instruction, when one of the processors 102 transfers to one of the memory modules a memory address to be read from. Subsequently, the memory unit transfers the data read from the address back to the processor, using the command data format. During a WRITE instruction, a processor sends a memory address to a memory module using the command address format, and then sends the data to be written into that address to the memory module, using the command data format of FIG. 3.

The command address format contains the address of a word on a memory module; this address is located in bits 0-14. Bits 15-21 hold the source address, the address of the sending device. Bits 36-39 contain the command code specifying the instruction or operation to be performed. Bit 43 is a parity bit for bits 0-42. Bit 44 gives the direction of the transfer on the bus. Bits 45-51 carry the address of the receiving device. FIGS. 2 and 3 illustrate the case, wherein the receiving device is a memory module. Bit position 52 is a parity bit for bit positions 45-51.

In the command data format of FIG. 3, data occupies the position 0-35. The remainder of the bits have the same structure as in the command address format.

Figure 4:
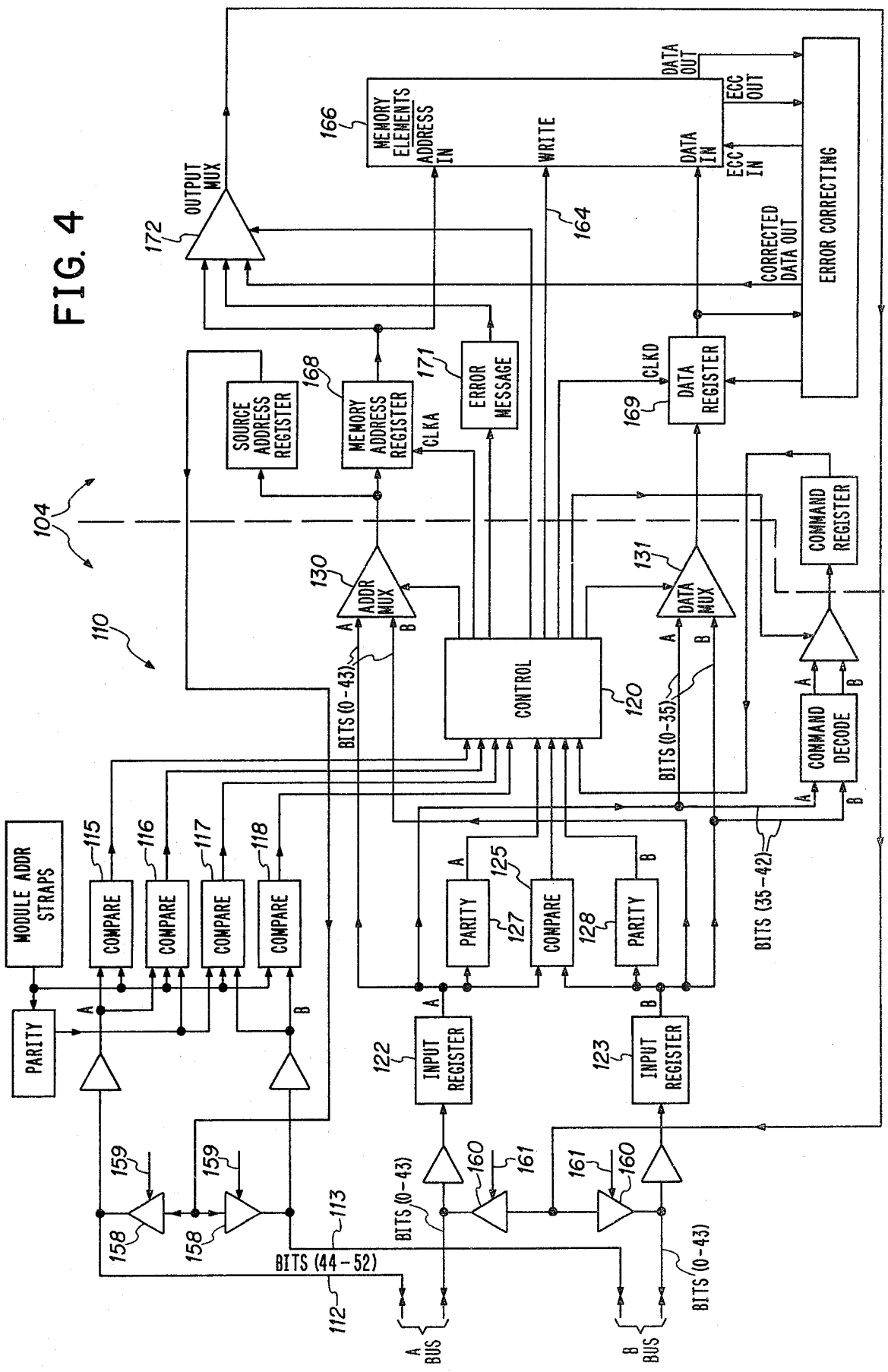
FIG. 4 is a block diagram of a memory module of the processing system of FIG. 1.

FIG. 4 is a block diagram of one of the memory modules 104 of FIG. 1. The section to the left of the dashed line in the diagram is mainly a bus interface and will be referred to generally by the reference numeral 110. The interface 110 functions to examine the signals received by the memory module on the two buses to determine whether memory module 104 is the particular module addressed by the buses, and whether there are errors in the received signals. If errors are detected, interface 110 decides whether to use the signals received on bus A or bus B or neither.

The processors 102 must also have interfaces performing these functions with respect to the logic buses. It is possible for the processors to employ interfaces which are basically the same as interface 110. Accordingly, the description of interface 110 should be considered with the understanding that it is applicable to all the units sending and receiving on the buses.

At the input of the memory unit 104, bits 44-52, comprised mainly of the module address are input from both buses A and B, on paths 112 and 113, to compare circuits 115-118. Comparison circuits 115-118 check the module addresses received on the buses and transmit the results to control logic 120.

Bits 0-43 of each bus A and B are brought into input registers 122 and 123, respectively. On the first word of either a READ or a WRITE, bits 0-43 include a memory address as shown in FIG. 2. On the second received word of a WRITE, the bits 0-43 contain data, as shown in FIG. 3. The contents of registers 122 and 123 are compared by compare circuit 125, and the parity of the input register contents are computed by parity checkers 127 and 128. The results of these comparison and parity checks are sent to control logic 120, which considers them along with the outputs of module address compare circuits 115-118 to detect errors and select between the signals received on bus A and bus B. The bus selection is made at address multiplexer 130 for the command address format of FIG. 2 and at data multiplexer 131 for the command data format of FIG. 3.

Figure 5:
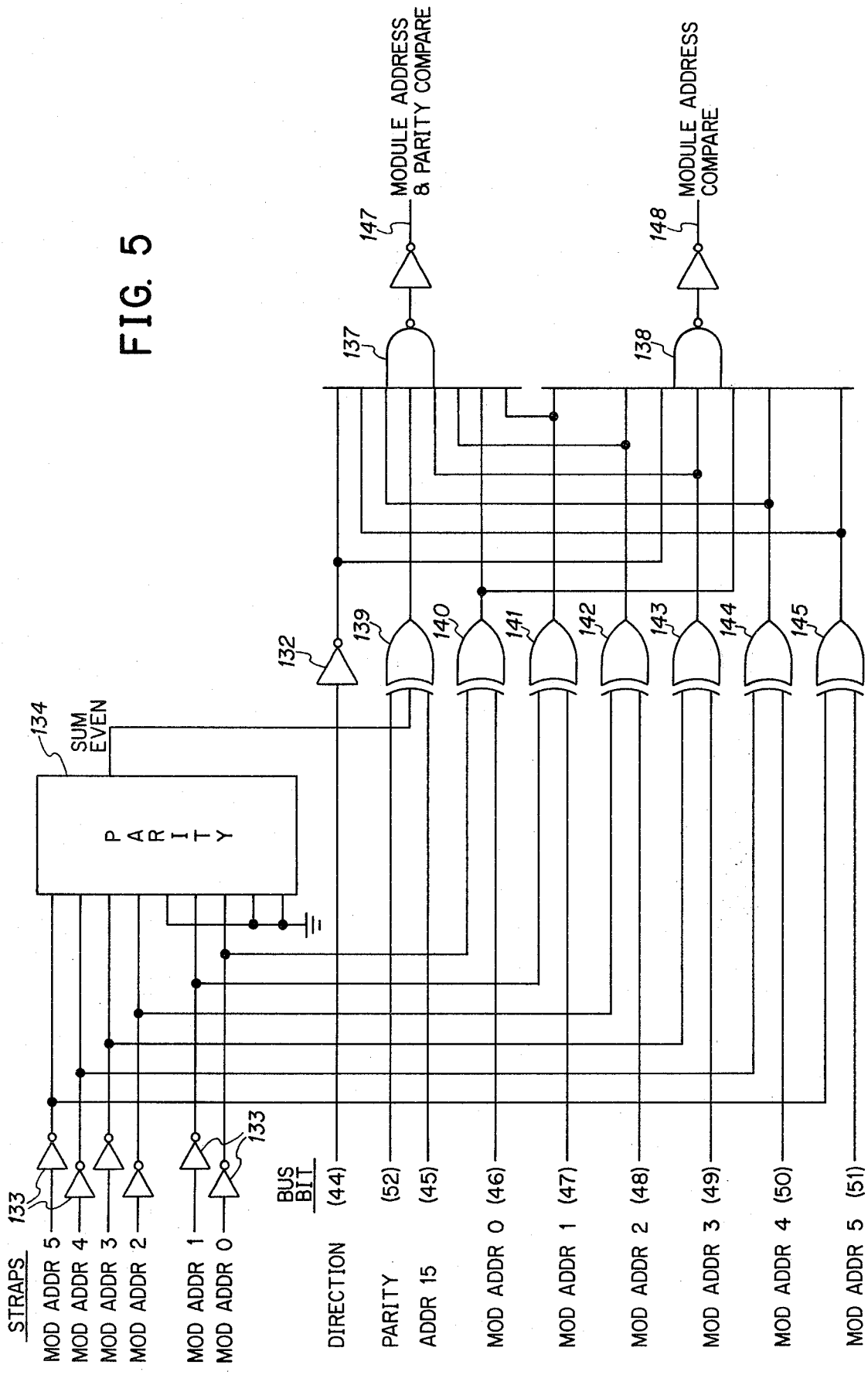
FIG. 5 is a logic diagram of a part of the memory module of FIG. 4 which is engaged in checking the module address portion of signals received on a bus.

FIG. 5 shows details of compare circuits 117 and 118. The output 147 is the output of comparison circuit 117, while the output 148 is the output of comparison circuit 118. The inputs to the circuit of FIG. 5 are bits 44-51 of bus B, along with the straps MOD ADDR0-MOD ADDR 5, which express the address of the memory module 104. The circuit of FIG. 5 is complicated somewhat in order to illustrate how to deal with a bus bit configuration slightly different from that illustrated in FIGS. 2 and 3. In this configuration, the memory module address comprises only six bits, which occupy bits 46-51 of the bus. Bit 45 is used for the highest order bit of a word address on the module 104.

Exclusive OR gates 140-145 each have at one input thereof one of the module address strap inputs inverted by one of the inverters 133. At the other input of each exclusive OR gate is the one of the bus bits 46-51 which corresponds to the strap bit. Each exclusive OR output should be a logical 1 if the srap bit and received address bit are the same. It is not possible to directly perform this same operation with respect to bus bit 45, since it is not known whether a logical 1 or 0 will be transmitted to the memory unit 104. However, certain information is known. Bus bit 52 is the received parity check bit for bits 45-52 of the bus. The correct parity for bits 46-51 can be computed by parity checker 134, receiving the inverted module address straps as input. This leaves bit 45 as the only unknown component of the parity.

The "sum even" output of parity checker 134 is input to exclusive OR circuit 139 along with parity bit 52 and address bit 45. Exclusive OR gate 139 should embody the logical equation found in a Texas Instruments SN54S135 integrated circuit, wherein the output is high whenever only one of the three inputs is high or when all three of the inputs are high. It turns out that gate 139 should present a logical 1 whenever parity bit 52 and address bit 45 are properly received, whether bit 45 is a logical 1 or logical 0.

Direction bit 44 is inveted by inverter 132 and applied to each of NAND gates 137 and 138. Direction bit 44 should be a logical 0 during transmission from the processors 32 to the memory units 34 and 35. When the direction bit is properly received as a logical 0, a 1 is applied to each of the NAND gates. Each of the outputs of exclusive OR gates 140 and 145 is applied to both of the NAND gates 137 and 138. The output of exclusive OR circuit 139 is applied only to NAND gate 137.

If the address on the bus is directed to memory module 104 and all the bits 44-52 are properly received at the module, then all the inputs to NAND gates 137 and 138 will be logical 1's, and the outputs 147 and 148 will be logical 1's. If any of the bits are not properly received, then one or both of the outputs 147 and 148 will be a logical 0. Output 148 indicates that the memory unit or memory module address received corresponds completely to that of memory module 104, while output 147 indicates that, in addition, the received signals corresponds, in parity, to the received parity check bit 52.

For the simpler case, in which bits 45-51 are all module address bits, the following modifications would be made. Exclusive OR gate 139 would be replaced by two exclusive OR gates, each with two inputs. One gate would compare the module address bit 45 to a module address bit strap. The other would compare the received parity bit 52 with the parity computed from the module address straps.

As illustrated in FIG. 4, parity checker 127 computes the parity of bits 0-43 of bus A, which are in register 122, and transmits the results to control logic 120. Parity checker 128 performs the same function for the signals from bus B in register 123. The parity of bits 0-43 may be referred to as "data parity" herein, as contrasted to the module "address parity" of bits 45-52. Actually, of course, even in the command data format of FIG. 3, bits 0-43 contain more than just data. In the command address format of FIG. 2, a large fraction of these bits contain addresses. Similarly, bits 45-52 are not exclusively comprised of the module address. Comparison circuit 125 compares the contents of input register 122 with the contents of register 123, bit for bit, and transmits the result of the comparison to control logic 120.

Figure 6:
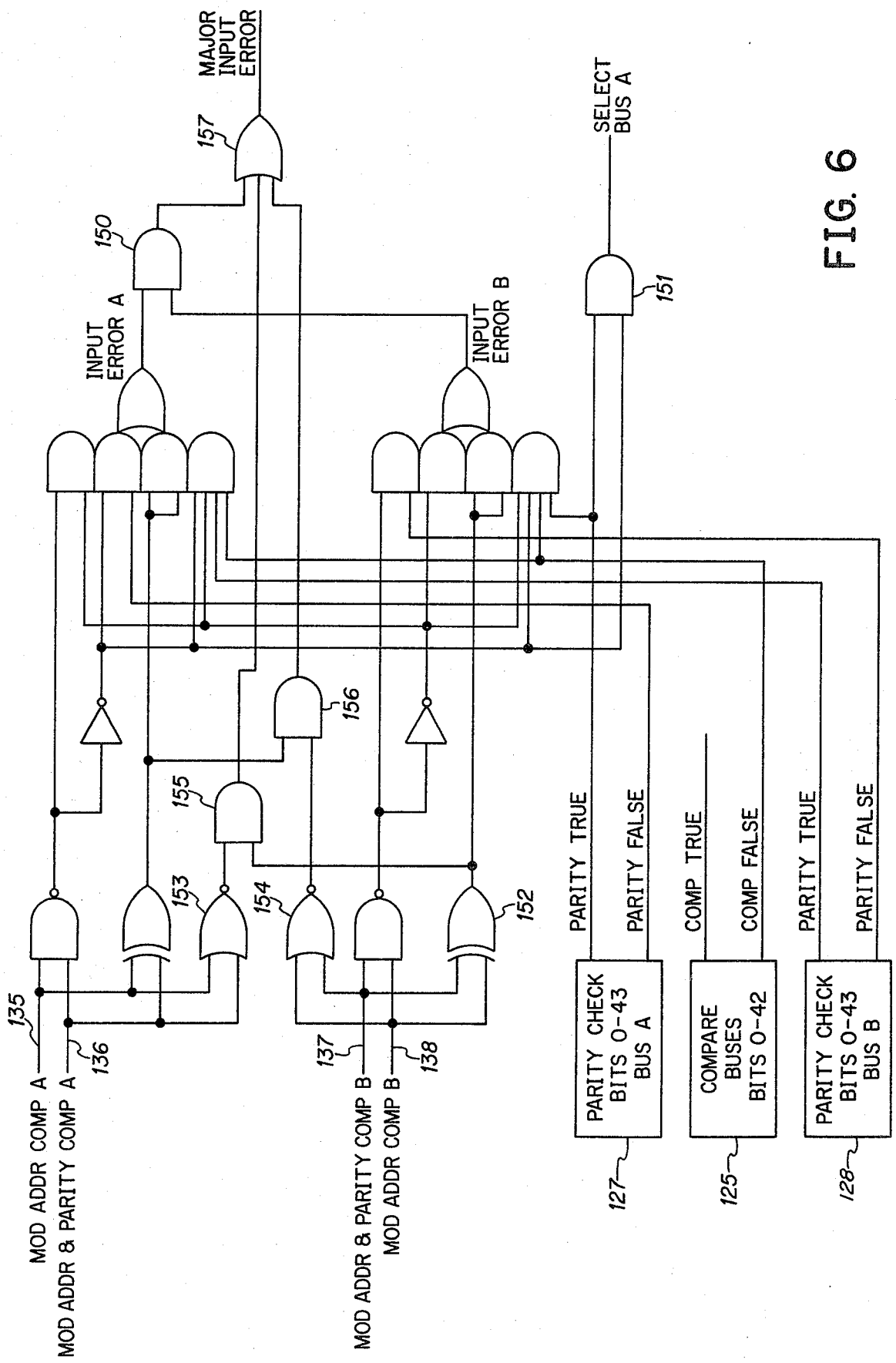
FIG. 6 is a logic diagram of a part of the memory module of FIG. 4 which is engaged in deciding whether to utilize signals received from a bus.

FIG. 6 shows a portion of control logic 120, responsive to the outputs 135-138 of comparison circuits 115-118 and to parity check circuits 128 and 127 and compare circuit 125. FIG. 6 is simplified to illustrate the manner in which the various addresses, parity checks and bus comparisons lead to the detection of errors and to decisions regarding utilization of the data. There are additional factors which are beneficial to include in the definition of a bus input error and the occurrence of a major input error. One factor, in particular, is whether one of the buses A and B is intentionally turned off. It is an advantage of the present invention that the processor system can at times be operated with only one bus; naturally, this situation must be incorporated into that portion of the control logic relevant to error detection, so that the inactive bus will not be perceived as an error. The logic shown and the description herein are set forth so as to illustrate automatic bus selection, as though both buses were always operating.

The logical elements of FIG. 6 embody equations for detecting input errors on buses A and B as follows:

INERRA—Input Error—Bus A
INERRB—Input Error—Bus B
MACA—Module address comparison is good—Bus A
MAPCA—Module address and parity comparison is good—Bus A
MACB—Module address comparison is good—Bus B
MAPCB—Module address and parity comparison is good—Bus B
DPA—Parity of bits 0-43 checks good—Bus A
DPB—Parity of bits 0-43 checks good—Bus B
CPR—Comparison of buses, bits 0-42, is good.

| INERRA = | (MACA' + MAPCA') . (MACB . MAPCB) | (1.1) |
|---|---|---|
| | + MACA . MAPCA . DPA' | (1.2) |
| | + MACA ⊕ MAPCA | (1.3) |
| | + (MACA . MAPCA) . (MACB . MAPCB) . DPB . CPR' | (1.4) |
| INERRB = | (MACB' + MAPCB') . (MACA . MAPCA) | |
| | + MACB . MAPCB . DPB' | |
| | + MACB ⊕ MAPCB | |
| | + (MACB . MAPCB) . (MACA — MAPCA) . DPA . CPR' | |

Portion 1.1 of the equations indicates that an input error is detected on bus A, when the module address comparison and module address-plus-parity compairson are both good for bus B, and either the address comparison or address-plus-parity comparison is bad on bus A.

A second condition for an error on bus A, as indicated by the portion 1.2 of the equations, is when the module address comparison and module address-plus-parity comparisons for bus A are both good, and the parity check for bits 0-42 from bus A is not good.

A third condition for an error on bus A is shown in part 1.3 of the equations. This condition occurs when either the module address comparison for bus A or the module address-plus-parity comparison for bus A is good, but it is not true that both comparisons are good.

From portion 1.4 of the equations, it can be seen that an input error on bus A is detected when the module address comparisons and module address-plus-parity comparisons on both channels A and B are good, and the parity check of bits 0-43 on bus B is good, but the comparison of the two buses (bits 0-42) is not good.

The equations for the detection of an input error on bus B are the same as those for bus A, except substituting B for A and A for B. When an input error is detected on both bus A and bus B, AND gate 150 produces an indication of a major input error. When this occurs, control logic 120 insures that module 104 does not utilize the signals received on buses A and B by completing execution of an instruction. For READ type instructions, control logic 120 disables output drivers 158 and 160 by means of their control inputs 159 and 161. This prevents memory module 104 from outputting data onto the buses A and B. For a WRITE type instruction, the major input error indication causes control logic 120 to inhibit write enable 164, thereby preventing writing data to memory elements 166.

Inspection of the equations for INERRA reveals that no input error will be generated where both the module address comparison and module address-plus-parity comparison for a bus are bad. In this situation, it is supposed that the signals on the bus are simply not addressed to the module 104. In the situation where the module address and module address-plus-parity comparisons are all bad on both buses, control logic 120 will not issue clock pulses CLKA and CLKD to memory address register 168 and data register 169, respectively. As a result, the contents of the input registers 122 and 123 do not move to address register 168 or data register 169, and the signals from the bus are not utilized. If at least one of the compare circuits 115-118 indicates a good comparison, then signals from the buses are clocked into memory address register 168 or data register 169, as appropriate. Where it is only one of the outputs of compare circuits 115-118 (FIG. 4) which indicates a good comparison, the logic of gates 153-156 of FIG. 6 comes into play.

To illustrate the operation of the logic of gates 153-156, consider the situation wherein the module address comparison and module address-plus-parity comparison on channel A are both bad. That is, both inputs 135 and 136 are false. Further suppose that one of the inputs 137 and 138 is true, and that the other is false. It is very likely in this case that the information on the buses is not addressed to memory module 104, and that an error has simply caused one of the compare circuits 115–118 to show a good comparison. With the supposed states of inputs 135–138, both inputs of AND gate 155 will be true, so that it delivers a true input to OR gate 157, thus indicating a major input error. An input error will be indicated for bus B by the operation of exclusive OR gate 152, but no input error will occur for bus A. Even though there is an input error on only one of the buses, it is desired to indicate a major input error, so that the data on the buses will not be utilized.

Bus selection logic associated with AND gate 151 of FIG. 6 operates in cooperation with the error detection logic described above, in order to select whether signals from bus A or bus B or neither bus are to be utilized. When the output of bus A parity check circuit 127 (FIG. 4) is good, and when both the module address comparison and address-plus-parity comparisons for bus A are good, the output of AND gate 151 is true. This causes address multiplexer 130 or data multiplexer 131 to select the signals from bus A to be applied to memory address register 168 or data register 169, respectively. If the output of gate 151 is false, then the signals from bus B are applied by one of the multiplexers 130 or 131 to register 168 or 169. If the selected signals from bus B are, by all indications, good, then they will be utilized by the memory module. However, if there is detected an input error on bus B, then this together with the error detected on bus A will result in a major input error. That is, an error on bus A causes bus B to be selected; an error on bus B as well causes the signals on neither bus to be utilized.

When control logic 120 detects an error in the signals received from either bus, it causes error message logic 171 to provide an error code to output multiplexer 172. An error response word is formed for transmission on the buses back to the device from which the memory module 104 received the erroneous signals. When the instruction is a READ instruction and is successfully completed in the presence of an error, the data read from memory elements 166 is returned. The error is stored in a status word where it can be examined by a processor.

Other devices on buses A and B are equipped with error detection and bus selection logic of the kind illustrated in detail for memory module 104. As a result, any of these devices can detect errors in the signals received from the buses, and if the errors are limited to one bus, they can automatically continue operation with the signals from the other bus. As described in the introductory portion of this application, the ability to satisfactorily complete execution of an instruction, while detecting and signalling an error has great advantage both in overall system reliability and fault location.

The redundant bus system of the invention goes even further, however. By its very nature, it can detect errors which are undetectable in a conventional single bus system which relies on parity check circuits such as circuit 127 or 128 (FIG. 4). This is possible, because each device on the buses can compare the signals received on the two buses by means of a circuit like compare circuit 125 (FIG. 4). The compare circuit 125 will prevent the utilization of erroneous signals from the buses, when no other errors are detected by compare circuits 115–118 and parity check circuits 127 and 128.

The redundant bus processing system of the invention provides the opportunity to achieve considerable advantage in the reliability of complex processing systems. The improved operation of the system of the invention derives from a number of novel features set forth in detail in the appended claims.

I claim:

1. In a data processing system of the kind wherein multiple devices such as processors and memory modules communicate amongst themselves by transmitting in parallel a plurality of bits on a bus from a sending device to an addressed device, with each of said devices typically being capable of acting as a sending or an addressed device, the improvement comprising:
   a first bus having a first plurality of electrical signal conductors with the capacity for carrying in parallel a plurality of bits including a device address and a set of bits which can include data;
   a second bus having a second plurality of electrical signal conductors, of at least the same capacity as said first bus;
   an interface at each device capable of acting as a sending and addressed device, including
   means for simultaneously transmitting in parallel a plurality of bits on conductors of said first bus, and for transmitting the same bits on conductors of the second bus;
   means for examining transmitted bits as received on each bus for an error involving any number of bits, including means for comparing every bit in said set of bits on said first bus with the corresponding bit in said set of bits on the second bus, and for generating an indication of a good comparison only when all the compared bits match; and
   means, responsive to the results of said examining, for computing whether to utilize said set of bits received on the first bus and whether to utilize said set of bits received on the second bus.

2. The data processing system of claim 1, wherein the bits transmitted on each of said buses include an error correcting code applicable to said set of bits, and said means for examining includes means for checking bits received on each of said buses and for generating an indication of a good error correcting code check, when the received bits correspond to the associated error correcting code received.

3. The data processing system of claim 2, wherein said error correcting code includes a parity check bit.

4. The system of claim 2, wherein said computing means includes means for not utilizing bits received on one of said buses, when said error correcting code indication applicable to said set of bits received on said one bus is not good.

5. The data processing system of claim 1, wherein said means for examining includes means for comparing an address associated therewith with the device address as received on said buses.

6. The system of claim 5, wherein
   the bits transmitted on said buses include an error correcting code applicable to said device address, and
   said means for examining additionally includes means for checking the received error correcting code applicable to said address.

7. The system of claim 6, wherein said means for checking the received error correcting code applicable to said address includes:

means for computing a parity bit from said address associated with the means for examining, and means for comparing the computed parity bit with the received error correcting code applicable to said address.

8. The system of claim 5, wherein said means for examining includes first and second input registers, each associated with a different one of said buses and interposed between the associated bus and said means for comparing every bit in said set of bits, and said bits which include a device address are directed from said buses directly to said means for comparing an address, without the interposition of registers, whereby said means for comparing an address can execute the comparison function thereof substantially as soon as bits are received from the buses by said interface, and said means for comparing every bit in said set can execute the comparison function thereof after bits in said set have been entered into said input registers.

9. The system of claim 1, wherein said bits transmitted on each bus include an error correcting code applicable to said device address, and another error correcting code, applicable to said set of bits; and said means for examining has an address associated therewith, and additionally includes, means for comparing said associated address with the device address as received on said buses and for generating an indication of a good comparison when the compared addresses match, and means for checking bits received on each of said buses and for generating an indication of a good check, when the received error correcting code applicable to said address is in accordance with said associated device address and said compared addresses match.

10. The system of claim 9, wherein said means for computing includes means for deciding not to utilize data bits received on said first and second buses, when said indication of the comparison between bits of said set is not good, said error correcting code indications applicable to said set of bits received on said buses are good, said error correcting code indications applicable to said addresses received on said buses are good, and the indication of the address comparisons for said buses are good.

11. The system of claim 9, wherein said computing means includes means for not utilizing said set of bits received on one of said buses, when the address error correcting code indication for said one bus is not good, or when the address comparison indication for said one bus is not good.

12. The system of claim 1, wherein the bits transmitted on said buses include an error correcting code applicable to said device address, and said means for examining includes:

means for comparing the device addresses as received on said buses with an address associated with the examining means, and for generating an indication of a good comparison when the compared addresses match, and means for checking the received error correcting code applicable to said device address and for generating an indication of both a good comparison and a good check, when the compared addresses match and the received error correcting code applicable to said address is in accordance with said associated address and the received device address.

13. A data processing system, comprising:

a first bus including a plurality of electrical signal conductors;

a second bus including a second plurality of electrical signal conductors;

at least one processor and at least one memory unit, each such processor and memory unit including transmitting means and receiving means in order for a processor to send signals on said buses to a memory unit and for a memory unit to send signals on said buses to a processor, said transmitting means including means for transmitting a plurality of digital signals on conductors of said first bus, and for transmitting said same digital signals on the conductors of the second bus, said digital signals including a set of signals which can include data, a parity check bit applicable to said set of signals, an address capable of designating a selected receiving means, and a parity check bit applicable to said address, said receiving means including means for receiving signals from both said buses including means for computing from the received signals whether to utilize said set of signals received on said first bus and whether to utilize said set of signals received on said second bus, said means for computing including, means for detecting errors involving any number of bits by comparing said set of signals received on said first bus with said set of signals received on said second bus, and generating an indication of a good comparison only when all the compared bits match, means for checking signals received on each of said buses, including said set of signals, with respect to the parity check bit applicable to said set, means for comparing said address as received on said buses with an address designating said means for receiving signals, and means for checking signals received on each of said buses with respect to the parity check bit applicable to said address, whereby said buses provide multiple paths for the transmission of signals back and forth between a processor and a memory unit.

* * * * *